(No Model.)  3 Sheets—Sheet 2.

M. K. SARGEANT.
AGRICULTURAL MACHINE.

No. 560,112. Patented May 12, 1896.

WITNESSES

INVENTOR
Myron K. Sargeant
by
Attorney (No Model.) 3 Sheets—Sheet 3.
M. K. SARGEANT.
AGRICULTURAL MACHINE.
No. 560,112. Patented May 12, 1896.
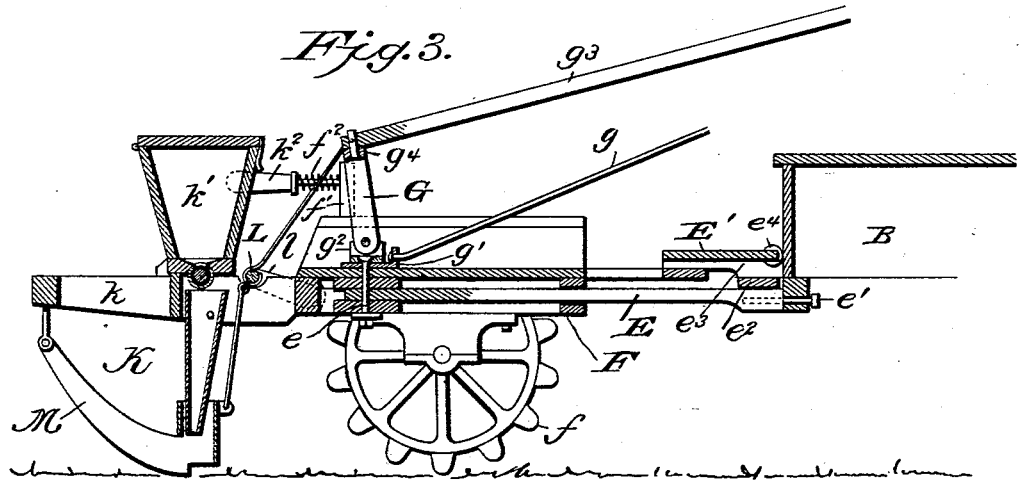
Fig. 3.
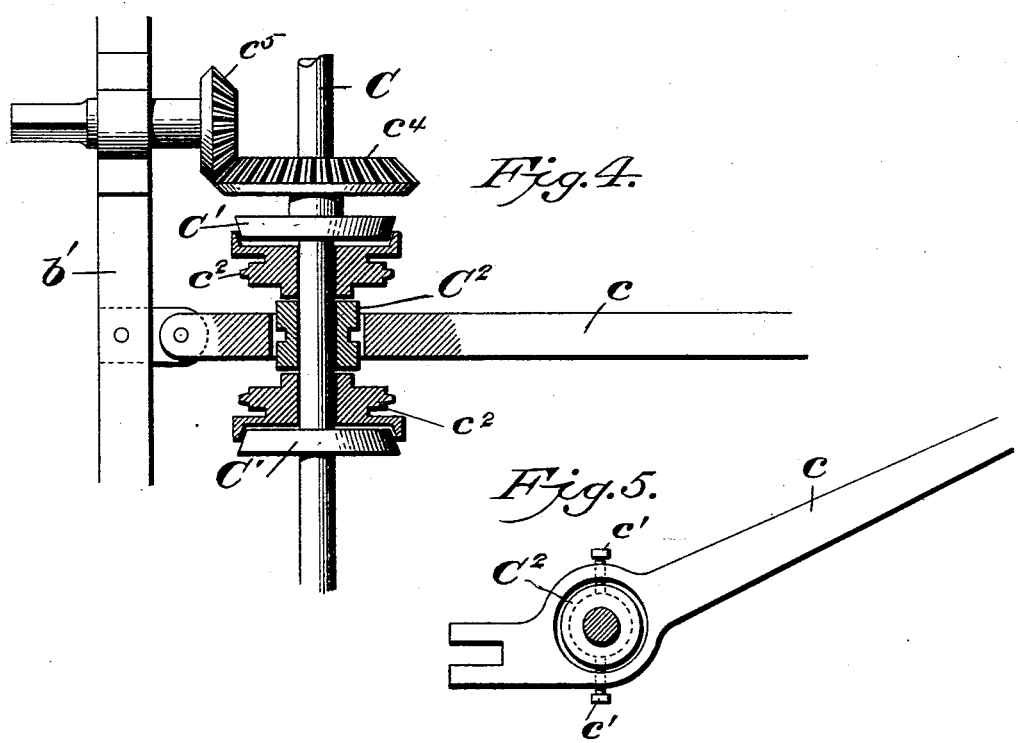
Fig. 4.
Fig. 5.
WITNESSES
G. S. Elliott
E. W. Johnson
Myron K. Sargeant
INVENTOR
by
Attorney

UNITED STATES PATENT OFFICE.

MYRON K. SARGEANT, OF MOSELLE, NORTH DAKOTA.

AGRICULTURAL MACHINE.

SPECIFICATION forming part of Letters Patent No. 560,112, dated May 12, 1896.

Application filed August 30, 1895. Serial No. 561,010. (No model.)

*To all whom it may concern:*

Be it known that I, MYRON K. SARGEANT, a citizen of the United States of America, residing at Moselle, in the county of Richland and State of North Dakota, have invented certain new and useful Improvements in Agricultural Machines; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to provide a traction-engine which has coupled to its forward end a roller-frame, to which is connected a suitable agricultural implement, as a seeder, means being also provided for coupling to the rear end of the traction-engine a gang of plows or cultivators.

In carrying out my invention I use a traction-engine the motive power of which is gasolene or other light oil. To the forward end of the traction-engine is coupled a front frame having rollers, the coupling being made and connections provided so that the front frame can be moved for steering the machine, seed-dropping mechanism or other suitable agricultural implement being connected to the front frame and operated therefrom.

The invention consists more especially in the construction, combination, and arrangement of the parts, as will be hereinafter fully set forth, and specifically pointed out in the claims.

Figure 1:
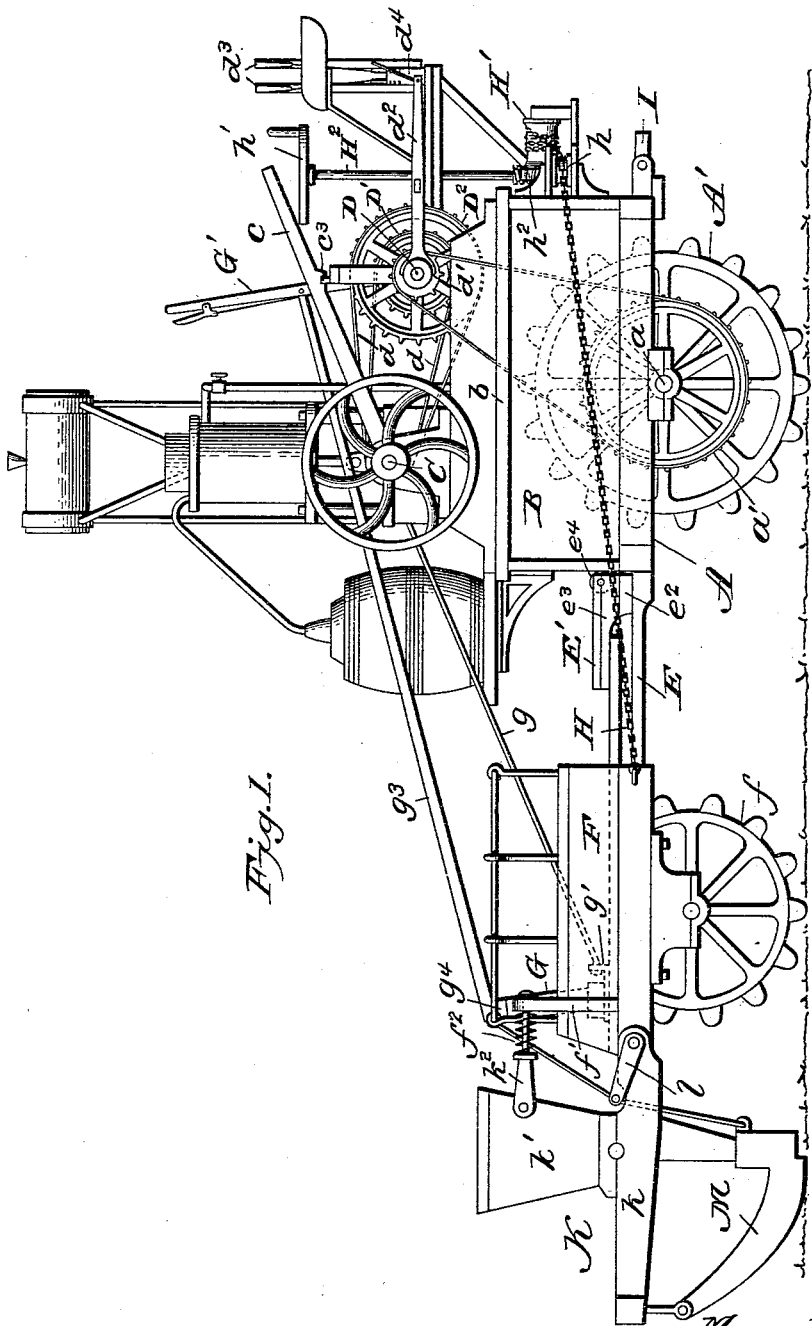
Figure 2:
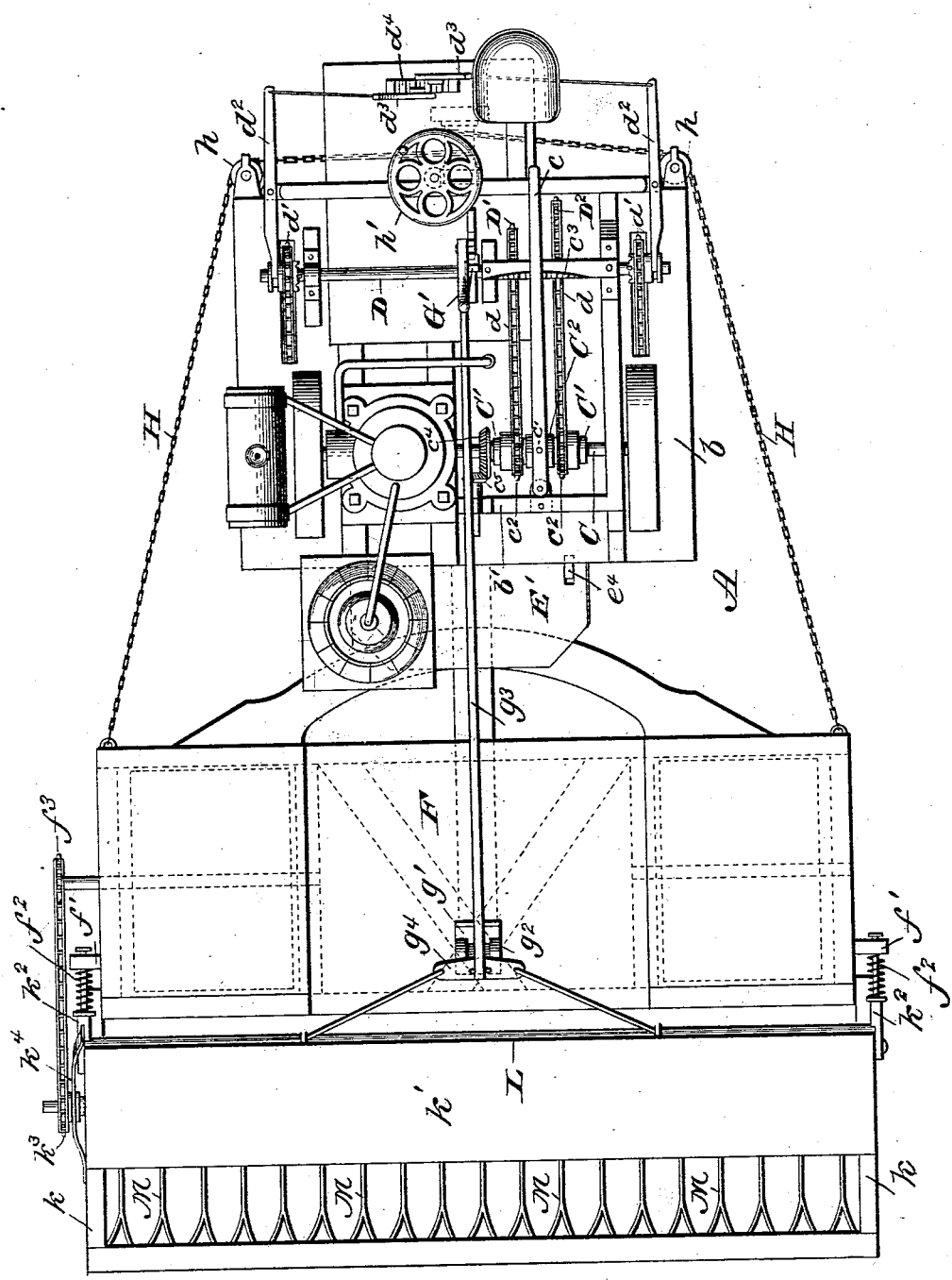

In the accompanying drawings, forming part of this specification, Figure 1 is a side elevation of a traction agricultural machine constructed in accordance with my invention. Fig. 2 is a plan view. Fig. 3 is a longitudinal sectional view of the forward part of the machine. Fig. 4 is a sectional view of the clutch mechanism on the main shaft of the traction-engine. Fig. 5 is a side elevation of the lever which operates the clutch mechanism shown in Fig. 4.

A designates the frame of the traction-engine, which is provided with a pair of independent supporting-wheels $A'$ $A'$, which are loosely mounted on the axle $a$, and to the outer end of each wheel is secured a sprocket-wheel $a'$, said sprocket-wheels being geared to the engine, as hereinafter described. The rims of the traction wheels or rollers $A'$ are made up of cross-bars, which are attached at their ends to heads mounted on the axle, and these cross-bars embed themselves in the ground, causing the machine to advance.

The box-frames B, in which the upper part of the traction-wheels are housed, are connected to each other at their upper ends by a platform $b$, and upon this platform the driving mechanism or engine is mounted. The gasolene-engine is of any approved type, the piston-rod thereof being coupled to a crank on the shaft C, said shaft being mounted in bearings carried by uprights secured to the platform $b$. Upon the shaft C are rigidly secured collars $C'$ $C'$, the inner faces of which are conical, as shown in Fig. 4. These collars are located a sufficient distance apart so that the shaft between said collars may receive loosely-mounted sprocket-wheels $c^2$ $c^2$ and an interposed loose collar $C^2$. The loose collar $C^2$ is provided with an operating-lever $c$, pivoted to a cross-bar $b'$ and having pins $c'$, which engage a groove in the periphery of the collar, so that when the lever is shifted to the right or left one of the sprocket-wheels $c^2$ will be forced in engagement with one of the collars $C'$ on the shaft C, so as to rotate therewith, the outer ends of the hubs of the sprocket-wheels having conical recesses which fit over the conical faces of the collars $C'$. The inner end of the lever $c$ is provided with a catch which engages a rack-plate $c^3$, so as to hold the lever in an adjusted position.

The shaft C is provided at its ends with fly-wheels, as shown, and at an intermediate portion has rigidly keyed thereon a beveled gear-wheel $c^4$ in mesh with a beveled gear-wheel $c^5$ on a stub-shaft carried by the cross-bar $b'$, the stub-shaft being squared at its outer end to receive the socketed end of a coupling-rod, which may be connected to a threshing-machine. One of the fly-wheels on the ends of the crank-shaft C may be adapted to receive a belt for driving a fanning-mill or other machinery. This arrangement of the parts adapts the engine to be employed for many other purposes than that shown in the drawings and hereinafter described, and when used for the purposes hereinbefore mentioned the lever $c$ is thrown to the position shown in Fig. 2, so that both of the sprocket-wheels $c^2$ will be out of positive engagement with the crank-shaft.

Rear of the shaft C and parallel therewith is mounted a shaft D, which is driven from said shaft by means of sprocket-chains $d$ $d$, which extend from the sprocket-wheels $c^2$ and pass over sprocket-wheels D' and $D^2$, keyed on the shaft D, one of the sprocket-wheels being larger than the other, so that the shaft D will be driven at a higher or lower rate of speed according to which sprocket-wheel $c^2$ is in engagement with the shaft C. On the ends of the shaft D are loosely mounted sprocket-wheels $d'$ $d'$, which are geared to the sprocket-wheels $a'$ on the traction-wheels by means of sprocket-chains, and the sprocket-wheels $d'$ are thrown in and out of engagement with the shaft D by pivoted levers $d^2$, the ends of which are bifurcated for engagement with peripheral grooves in the hubs of said sprocket-wheels. The levers $d^2$ are connected to independent operating-levers $d^3$, positioned near the driver's seat and having sliding dogs, which engage a segment-rack $d^4$, secured to the platform. By this arrangement both sprocket-wheels $d$ can be thrown in engagement with the driven shaft D and one of them thrown out of engagement when it is desired to turn the machine. The sprocket-wheels $d'$ have ordinary clutch-faces which engage fixtures rigidly attached to the shaft D.

F designates a roller-frame which is connected to the traction-engine by means of a coupling-bar E, the coupling-bar being connected to the frame F by means of a king-bolt $e$ and to the frame A by a horizontal pin or bolt $e'$. To the rear end of the coupling-bar E is secured a cross-bar $e^2$, which supports a transverse plate E', and against the under edge of the supports $e^3$ of said plate the rear end of the roller-frame F bears. In the rear end of the plate E' are mounted friction-rollers $e^4$, which bear against the part B of the traction-engine and provide for the rocking movement of the frames. The frame F is constructed to present a central platform and end elevated platforms, the end platforms being provided with guard-rails around three sides, and beneath said end platforms the supporting traction-wheels $f$ of the frame are located. The wheels $f$ are of the same construction as the wheels A' of the traction-engine.

From the bed of the traction-engine extends a rod $g$, the forward end of which is connected to a plate $g'$, attached to the upper part of the frame F by means of the king-bolt $e$, and above the plate $g'$ is a plate $g^2$, having upwardly-projecting members, between which is pivoted a lever G, the upper end of said lever being connected by a rod $g^3$ to an operating-lever G', located in front of the driver's seat on the traction-engine, said operating-lever having the usual sliding dog, which engages a segment-rack. The pivoted lever G is provided with a cross-head $g^4$, which is connected to the drills of the seed-planter for raising and lowering the same, as hereinafter described.

To the rear ends of the roller-frame F are attached flexible connections H H, which extend therefrom around guide-rollers $h$ at the rear end of the traction-engine to a drum H' mounted in a bracket secured to the frame of the traction-engine. The drum is turned by means of a vertical shaft $H^2$, provided with a hand-wheel $h'$ at its upper end and at its lower end with a worm in engagement with a gear-wheel $h^2$, secured to said drum, so that by turning the hand-wheel the drum will be rotated to turn the roller-frame F by drawing upon one of the flexible connections while the other is being "paid out." It will be here noted that the roller-frame F is wider than the traction-engine, so that the rollers or wheels $f$ thereof will be out of line with the rollers or wheels of the traction-engine. Beneath the bracket that supports the drum H' is attached a bail or other fixture I, to which may be coupled a gang of plows, harrows, or other suitable tilling apparatus.

K designates the seed-planter, which is pivotally connected at its rear end to the side pieces of the roller-frame F, and the side pieces $k$ thereof carry the seedbox $k'$, to the end pieces of which are secured rearwardly-projecting arms $k^2$, which pass through openings in uprights $f'$, secured to the elevated platforms of the roller-frame F, helical springs $f^2$ encircling the arms $k^2$ and interposed between collars thereon and the uprights $f'$, so as to exert a forward pressure upon the upper part of the seed-planter. The seedbox has a suitable rotary feed, and upon one end of the shaft is a sprocket-wheel $k^3$, which is geared to a sprocket-wheel $f^3$ on the outer end of the shaft of the adjoining roller $f$ of the roller-frame F. The sprocket-wheel $k^3$ is thrown in and out of engagement with its shaft by means of a lever $k^4$, which is operated by one of the pivoted arms $l$, which support the cross-bar to which the drills M of the planter are connected, the lever $k^4$ being pivoted at its forward end to the frame of the seed-planter and having an inwardly-bent rear end with which the arm $l$ engages when the cross-bar L is raised to elevate the drills above the ground, such movement throwing the sprocket-wheel out of engagement with its shaft, so that the seed-dropping mechanism will be discontinued. The cross-bar L is raised and lowered by means of the pivoted lever G, operated by the lever G', as hereinbefore described.

The seed-planter K can be readily disconnected from the roller-frame F when it is desired to use the traction-engine for drawing plows or harrows.

Having thus described my invention, I do not wish to be limited to the special construction of parts and details as herein shown and described, as it is obvious the parts may be modified without departing from the spirit of my invention.

I claim—

1. The combination of a traction-engine for agricultural machines, a shaft mounted thereon and driven from the engine, collars C′ rigidly connected to the shaft and having cone-faces, sprocket-wheels loosely mounted on the shaft between the collars, and an interposed loose collar, the outer ends of the sprocket-wheels having conical recesses which engage the conical faces of the collars; together with a shaft D having sprocket-wheels of different sizes which are geared to the sprocket-wheels on the crank-shaft, substantially as shown and for the purpose set forth.

2. In an agricultural machine, the combination with a traction-engine, of a roller-frame F connected thereto, a coupling-bar E attached to the roller-frame by a king-bolt and to the traction-engine by a horizontal bolt, a horizontal plate E′ secured to the rear end of the coupling-bar and having friction-rollers at its rear end, substantially as shown, whereby the frames are connected to each other so as to have an independent oscillating movement, together with means for turning the roller-frame from the traction-engine.

3. In an agricultural machine, the combination with a traction-engine, of a roller-frame F and seed-planter K connected thereto, a bar connecting the traction-engine to the roller-frame having a horizontal plate against which the rear end of the roller-frame bears; together with flexible connections H which are connected to the roller-frame and pass therefrom to a drum on the traction-engine over suitably-disposed guide-rollers, and means for turning the drum, substantially as shown and for the purpose set forth.

4. In an agricultural machine, the combination with a traction-engine, a roller-frame F coupled to the frame of the traction-engine substantially as described, and a seed-planter K pivotally connected to the roller-frame, a transverse bar L supported by arms pivoted to the roller-frame and connected to drills carried by the seed-planter; together with a pivoted lever G connected to the cross-bar L and operated by a lever G′ through the medium of a connecting-rod $g^3$, and a lever $k^4$ connected to the driving mechanism of the seed-dropper and operated by the supporting-arms of the cross-bar L, substantially as shown and for the purpose set forth.

5. In an implement of the character described, the combination of the frames F and K connected to each other substantially as shown, the frame K having seed dropping and planting mechanism, the shaft of the seed-dropping mechanism being driven from one of the supporting-rollers of the frame F, bars or rods connecting the upper part of the frame K to the frame F, and springs encircling said bars or rods and interposed between the frames; together with a lever for throwing the seed-dropping mechanism out of operation when the drills are elevated, substantially as described.

6. In an agricultural machine, the combination, of the traction-engine provided with a shaft C having sprocket-wheels $c^2$ $c^2$ loosely mounted thereon and adapted to engage with fixed collars on the shaft, a sliding collar or sleeve located on the shaft between the sprocket-wheels for moving the sprocket-wheels in engagement with their collars; a shaft D carrying sprocket-wheels D′ and D² of different diameters, the outer ends of the shaft carrying sprocket-wheels which are loosely mounted thereon and adapted to engage fixtures carried thereby, levers $d^2$ in engagement with the sprocket-wheels on the ends of the shaft D, and levers $d^3$ connected to the levers $d^2$ for throwing the same, the sprocket-wheels on the ends of the shaft D being geared to the supporting-wheels of the traction-engine; together with a roller-frame F and seed-planter K connected to the forward end of the traction-engine, substantially as shown and for the purpose set forth.

In testimony whereof I affix my signature in presence of two witnesses.

MYRON K. SARGEANT.

Witnesses:
W. H. MORGAN,
BENJ. SHEEHAN.